United States Patent
Satoh

(10) Patent No.: US 6,464,774 B1
(45) Date of Patent: Oct. 15, 2002

(54) SURFACE COATING MATERIAL INCORPORATING LITHIUM SILICATE AND SODIUM SILICATE

(76) Inventor: Yukio Satoh, c/o Mr. Nishihara, 1-11-21, Ohyaba, Urawa-Shi, Saitama-Ken (JP)

( * ) Notice: Subject to any disclaimer, the term of this patent is extended or adjusted under 35 U.S.C. 154(b) by 0 days.

(21) Appl. No.: 09/512,728

(22) Filed: Feb. 24, 2000

(51) Int. Cl.⁷ .............................................. C04B 12/04
(52) U.S. Cl. ....................................................... 106/600
(58) Field of Search ......................................... 106/600

(56) References Cited

U.S. PATENT DOCUMENTS

| | | | | |
|---|---|---|---|---|
| 4,319,926 A | * | 3/1982 | Nowakawski et al. | |
| 4,514,456 A | * | 4/1985 | Deal et al. | 428/204 |
| 5,891,238 A | * | 4/1999 | Griffith et al. | 106/635 |
| 6,060,114 A | * | 5/2000 | Sherman et al. | 427/130 |

FOREIGN PATENT DOCUMENTS

| | | | |
|---|---|---|---|
| JP | 48022123 | * | 3/1973 |
| JP | 50066531 | * | 6/1975 |
| JP | 52030827 | * | 3/1977 |
| JP | 57092559 | * | 6/1982 |
| JP | 57161068 | * | 10/1982 |
| JP | 61109867 | * | 5/1986 |
| JP | 61205681 | * | 9/1986 |
| JP | 362227968 | * | 10/1987 |
| JP | 02142859 | * | 5/1990 |
| JP | 404221082 | * | 8/1992 |
| JP | 05032915 | * | 2/1993 |
| JP | 07018202 | * | 1/1995 |
| JP | 07026166 | * | 1/1995 |
| JP | 2000256580 | * | 9/2000 |

* cited by examiner

*Primary Examiner*—Paul Marcantoni

(57) ABSTRACT

The present invention relates to provide a decorative wear resistant lithium silicate and sodium silicate based surface coating for use on concrete, timber or steel, comprising a coat of a high viscosity lithium silicate and sodium silicate solution incorporating a non reactive or inert filler and a pigment colouring matter, and after the coat is touch dry, the coat is treated with flame of gases directly to make fast reaction and harden the coat.

1 Claim, No Drawings

SURFACE COATING MATERIAL INCORPORATING LITHIUM SILICATE AND SODIUM SILICATE

BACKGROUND OF THE INVENTION

It has long been known to use sodium silicate (waterglass) as a concrete hardner, where for example, it has been traditional to use a low viscosity solution of sodium silicate which penetrates the concrete surface, and where it reacts with the concrete to produce insoluble calcium silicate. Although such treatments are useful in providing improved protection (for example against oil or acid and/or to improve fire resistance) and also wear resistance of the surface of the concrete, these treatments are basically useful only as clear treatments, since it is impossible to achieve any real opacity using such low viscosity material. This follows because the pigment molecules are larger than the sodium silicate molecules, and they tend not to be absorbed into the concrete and therefore remain on the surface of the concrete, left behind by the absorbing silicate. Thus any pigment that is utilised in such treatments in any attempt to colour the concrete, tends to be easily abraded or to be otherwise removed easily since there is no effective bonding occurring between the concrete and the pigment or with any intermediate bonding material.

Although attempts have been made to produce a surface coating incorporating sodium silicate, (because of its properties noted above and its relative cheapness), these have failed to date largely because sodium silicate itself is highly water sensitive and unless it is converted, say, to calcium silicate in traditional low viscosity treatments as described above, it will basically breakdown as a surface treatment, since it will degrade on exposure to water.

Although there are several known reactants available which will cause sodium silicate to harden, they each have proved to be ineffectual especially with regard to their slow reaction time, or to using a second hardner coat in case of fast reaction time. And consequently have limitations when considering sodium silicate as a surface treatment.

Also, it has long been known to use lithium silicate as a concrete hardner for example, it has been traditional to use a low viscosity solution of lithium silicate too. Attempts to use a high viscosity solution of lithium silicate were failed because of crack with shrinkage of coated film itself.

Furthermore, single coating formulation incorporating much filler and pigment has not been used.

SUMMARY OF THE INVENTION

It is therefore an object of the invention to provide a decorative wear resistant protective surface coating for concrete, timber or steel, based on lithium silicate and sodium silicate formulation which overcomes some or all of the foregoing disadvantages associated with either traditional low viscosity treatments for concrete or ameliorates the effects of previous attempts at producing an opaque surface coating.

It is an another object of the invention to provide a decorative wear resistant protective surface coating for concrete, timber or steel, based on a single formulation which means a lithium silicate and sodium silicate formulation incorporating filler and pigment, avoiding a troublesome use of a second formulation for hardner.

It is an another object of the invention to provide a decorative wear resistant protective surface coating for concrete, timber or steel, based on a single formulation of which dried coat is hardened with flame of gases such as town or propane gas directly for a veryshort time.

At the very least, the invention provides an alternate treatment for protecting a concrete or other surfaces.

DETAILED DESCRIPTION OF THE INVENTION

According to the present invention, there is provided a decorative wear resistant lithium silicate and sodium silicate formulation incorporating filler and pigment.

This formulation comprises a special ratio of lithium silicate and sodium silicate mixture which is diluted or not diluted with small amount of water to keep a high viscosity, and a non reactive inert filler and a pigment colouring matter.

In this formulation a binder for filler, for example, an emulsion of acryl-stylene co-polymer can be used.

The special ratio of lithium silicate, sodium silicate and water is shown in the followings,
(1) lithium silicate: (silica/lithium oxide molar ratio is 3.5 and specific weight 1.20 at 20° C.)
   50 to 90 parts
(2) sodium silicate: (No. 3 sodium silicate regulated in Japanese Industrial Standard code number K-1408)
   10 to 30 parts
(3) water:
   0 to 20 parts Whereas typical low viscosity solutions of sodium silicate utilise a ratio of about 1 part sodium silicate to 4 parts water, it is preferred that the solution for the present invention have a ratio of about 4 to 5 parts lithium silicate and sodium silicate to 1 part water, in order to maximise viscosity and thereby, decrease penetration of the coat into the concrete or other substrate.

In the present invention, effects of water is that water beyond 20 parts causes less wear resistant and less water resistant properties.

In the present invention, effect of lithium silicate ratio to sodium silicate is that high ratio of lithium silicate causes good water resistant property but causes shrinkage of hardened coat, and high ratio of sodium silicate causes swelling or bubbling of coat during heat treatment with flame of gases, and causes less water resistance.

The specific ratio of lithium silicate, sodium silicate and water above described is determined under consideration of these effects and defects both.

Examples of a non reactive or inert filler are powdered alumina or powdered quartz, while any suitable pigment of metal oxides such as ferric oxide, chromic oxide, titanium oxide and so on, can be utilised.

The preferable amount of filler is 20 to 65 parts against 100 parts of lithium silicate and sodium silicate solution.

The preferable amount of pigment is 5 to 20 parts against 100 parts of lithium silicate and sodium silicate solution.

The coat may be applied by any suitable means such as roller, brush or spray, once or twice on a cleaned surface of concrete, timber or steel.

The coat will be touch dry in approximately 10 to 30 minutes and the coat is treated with flame of gases directly for 1 second to 3 minutes. Thus, the coat is fully reacted very fast and shows excellent physical and chemical properties.

It is an obvious that the time of the heat treatment depends on the temperature of the flame, the size of the flame and contacting portion of the flame on a coat.

The flame temperature of town gas or propane gas is about 800 to 1100° C.

The crystal change of lithium silicate gels is known to occur at 348° C. and strongly absorbed water in lithium silicate gels is known to lose under 400° C., the temperature of the baked coat may be estimated around at 400 to 450° C.

When a substrate is concrete, long time of this treatment should be avoided, because crystal water of the concrete may be started to lose from at 450° C. and structures of the concrete will be damaged.

Actually, the treatment by propane gas flame is sufficient for several seconds to 10 seconds as is shown in the Examples.

Accordingly, the treatment by propane gas flame on a timber can be done without any damage to it with using the formulation of the present invention.

Thus, an extremely durable, decorative and wear resistant coat can be easily made.

Furthermore, on the next day of the coating works using a formulation of the invention, the coated construction such as concrete parking lots or concrete floor of a warehouse can be used, and an economical merits can be greatly enjoyed.

In case of no heat treatment to the coat, there occurs crack and shrinkage of the coat, and also physical properties such as wear resistance and water resistance are much inferior to those of the heat treated coat.

Therefore, a formulation of the invention can be applied to make mortar wall, mortar brick, timber products and etc. decorative and wear resistant, furthermore, to make parking lots, concrete floors of factories, warehouses and etc. decorative and wear resistant. Also, a formulation of the invention can be applied to make concrete floors of foods factories durable and resistant for sterilizing chemicals.

EXAMPLE 1

The following a single formulation for the coat was used.
Coat Formulation:

| | |
|---|---|
| Lithium silicate solution (silica/lithium oxide molar ratio is 3.5 and specific weight is 1.20 at 20° C.) | 750 g |
| Sodium silicate solution (No. 3 regulated in Japanese Industrial Standard code number K-1408) | 135 g |
| Water | 85 g |
| Emulsion of Acryl-stylene copolymer | 30 g |
| Powdered aluminium oxide (40μ average) | 500 g |
| Pigment (Ferric oxide) | 150 g |

Coat above was coated on the surface of concrete test piece which is 7 cm long, 20 cm wide and 2 cm thick equaly with a roller.

When the coat became touch dry, about 30 minutes passed, the coat was coated with a roller. Again, when further 30 minutes passed, the coat became touch dry and the thickness of the coat became about 0.3 mm.

Three hours after, the coat was treated with flame of propane gas directly for several seconds. The coat became very hard and beautifully decorative without any swelling of of coat and any damage of concrete test piece.

EXAMPLE 2

The coat formulation of Example 1 was used to prepare test pieces which were required to measure physical properties of the coat.

Results are shown in the followings.

(1) Abrasion Test

This test was exected by the method similar to JIS code number K-7204.

The decrease thickness of the coat was 0.27 mm and 0.09 mm when a abrasion wheel was rotated 500 and 1000 rpm. respectively.

For a reference, decrease thickness of the concrete test piece itself was 1.07 mm under 1000 rpm. of abrasion wheel.

(2) Adhesive Strongth Test

This test was exected by the method similar to JIS code number A-5909.

The adhesive strength was 26.5 kgf/cm$^2$ under normal condition and the adhesive strength was 28.6 kgf/cm$^2$ after immersing in water.

An another adhesive strength after cycling of heat and cool was 24.5 kgf/cm$^2$.

(3) Weathering Test

This test was exected by the method similar to JIS code number A-6909.

The color differences of the coat was 0.3 after 500 hours and 1000 hours both.

The figure Of 0.3 means almostly no change of colur.

(4) Chemical Resitance Test

This test was exected by the method similar to JIS code number A-1454.

| | Evaluation |
|---|---|
| 15% surfuric acid | ◎ |
| 10% hydrochloric acid | ◎ |
| 5% acetic acid | ◎ |
| 10% lactic acid | ◎ |
| 10% citric acid | ◎ |
| 10% sodium hydroxide | Δ |

Remarks:
◎ No change
Δ Appiarance change
X Failed

EXAMPLE 3

This example was exected similarly to Example 1, excepting coat formulation only.

The coat formulation of this example is shown below.

| | |
|---|---|
| Lithium silicate solution (silica/lithium oxide molar ratio is 3.5 and specific weight is 1.20 at 20° C.) | 570 g |
| Sodium silicate solution (No. 3 regulated in Japanese Industrial Standard code number K-1408 ) | 250 g |
| Water | 150 g |
| Emulsion of Acryl-stylene copolymer | 30 g |
| Powdered aluminum oxide (40μ average) | 400 g |
| Pigment (Ferric oxide) | 100 g |

The formed coat became very hard and beautifully decorative without any swelling of coat and any damage of concrete test piece.

Result of abrasion test was that decrease thickness of the coat was 0.30 mm and 0.10 mm when a abrasion wheel was rotated 500 and 1000 rpm. respectively.

EXAMPLE 4

This example was exected similarly to Example 1, excepting coat formulation only.

The coat formulation of this example is shown below.

And when the coat became touch dry coat was treated with flame of town gas directly for about 10 seconds.

| | |
|---|---|
| Lithium silicate solution (silica/lithium oxide molar ratio is 3.5 and specific weight is 1.20 at 20° C.) | 810 g |
| Sodium silicate solution (No. 3 regulated in Japanese Industrial Standard code number K-1408) | 110 g |
| Water | 50 g |
| Emulsion of Acryl-stylene copolymer | 30 g |
| Powdered aluminum oxide (40μ average) | 600 g |
| Pigment (Ferric oxide) | 100 g |

The formed coat became very hard and beautiful decorative without any swelling of coat and any damage of concrete test piece.

Result of abrasion test was that decrease thickness of the coat was 0.26 mm and 0.08 mm when a abrasion wheel was rotated 500 and 1000 rpm. respectively.

EXAMPLE 5

This example was exected similarly to Example 1, except that 500 g of powdered quartz (5 to 400 mesh pass ) was used as filler instead of powdered alumimun oxide.

The formed coat became very hard and beautiful decorative without any swelling of coat and any damage of concrete test piece.

Result of abrasion test was that decrease thickness of the coat was 0.35 mm and 0.12 mm when a abrasion wheel was rotated 500 and 1000 rpm. respectively.

EXAMPLE 6

This example was exected similarly to Example 1, except that coat was made on the surface of a timber (10 cm wide, 10 cm long and 1 cm thick ) after using a water proof primer on it.

The formed coat became very hard and beautifully decorative without any swelling of coat and any damage of the timber test piece.

The advantages in utilising a formulation of the present invention are as follows.

(1) A coloured pigmented durable surface coating is provided.

(2) A wear resistant and chemicals resistant surface coating is provided.

(3) A coating formulation which has good workability is provided without using any hardner.

(4) A coating formulation which can be hardened with flame of gases in extremely very short time is provided.

(5) Furthermore, a formulation of the present invention is utilised not only to factory products, but to concrete structures which was already constructed and repairing of their cracks too.

What is claimed is:

1. A durable and water-resistant paint binder composition consisting of from 55 to 85% by weight of lithium silicate solution that has a silica/lithium oxide molar ratio of 3.5;

from 10 to 27% by weight of sodium silicate solution that has a silica/sodium oxide molar ratio of 3; and from 5 to 18% by weight of water.

* * * * *